Nov. 23, 1937.  F. H. SCHNEIDER  2,100,292
BURNER FORMING GRID
Filed July 17, 1936
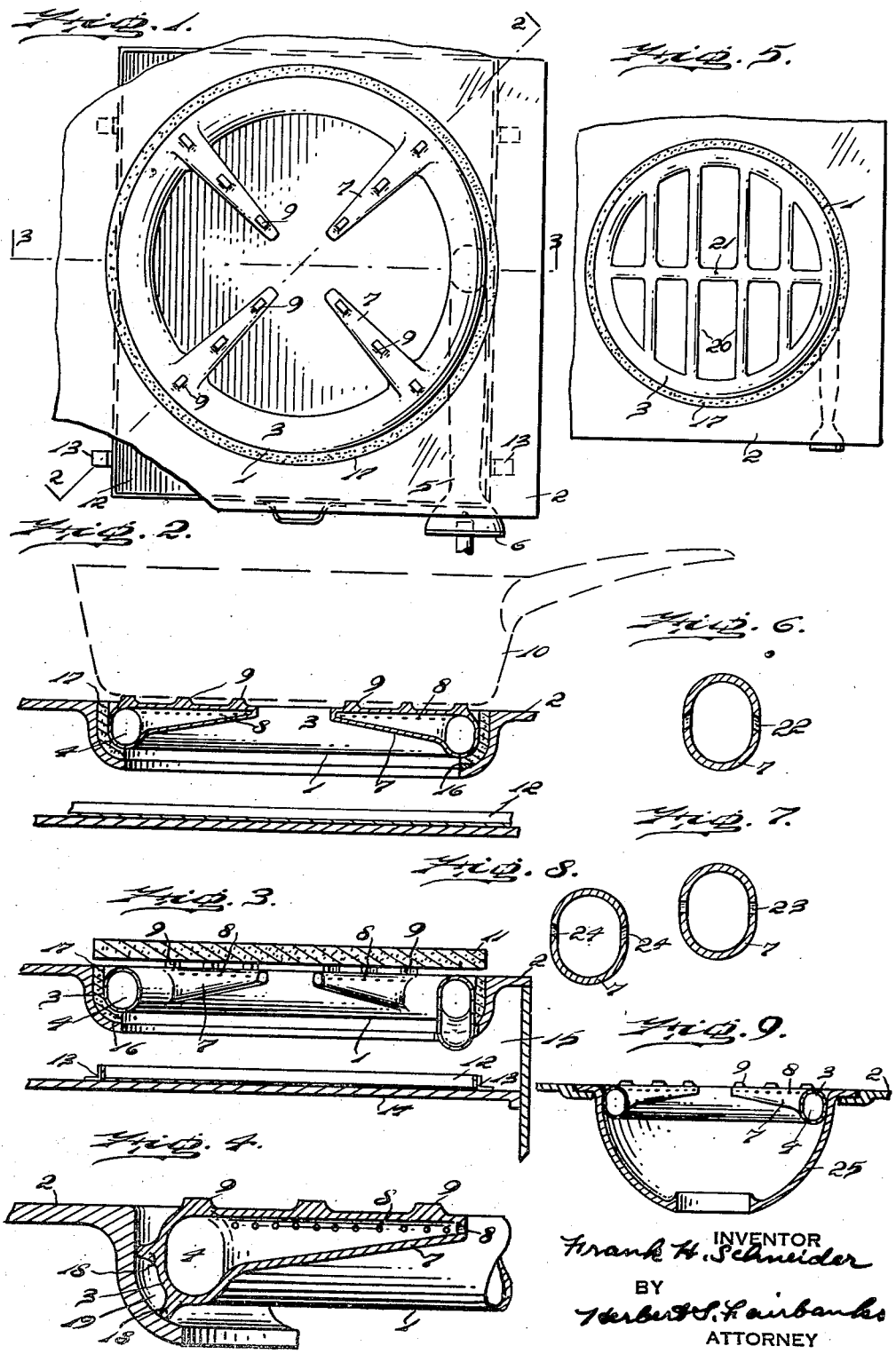
INVENTOR
Frank H. Schneider
BY
Herbert S. Fairbanks
ATTORNEY Patented Nov. 23, 1937

2,100,292

UNITED STATES PATENT OFFICE 2,100,292

BURNER FORMING GRID

Frank H. Schneider, Royersford, Pa., assignor to The Floyd-Wells Company, Royersford, Pa., a corporation of Pennsylvania Application July 17, 1936, Serial No. 91,043

3 Claims. (Cl. 126—39)

The object of this invention is to devise a novel burner forming grid which will materially increase the efficiency of the burner operations.

I have found out as a result of numerous experiments, that if the burner is formed as a part of the grid that many advantageous features result.

The distance between the burner ports and the bottom of the utensil can be decreased.

The total mass of the burner and grid is reduced, thereby eliminating radiating losses from the burner.

Any interference of the grid fingers or bars on the gas flame is eliminated, which is a material advantage, since the more direct the flame is to the cooking utensil without interference, the higher will be the efficiency of the burner. As the burner serves a double function of a burner and a grid, and the cooking utensil sets directly upon it, there is rapid conduction of heat between the grid and the cooking utensil. Heat losses are reduced to a minimum since the stored heat of the burner and grid is utilized by the absorption of heat by the cooking utensil, whereas in burners, as heretofore constructed, the stored heat of the burner is radiated into the atmosphere.

A further object of the invention is to eliminate the conduction of heat from the grid to the cooking top of the range, and this can be advantageously accomplished by insulating material or by an air space between the grid and the cooking top.

A further object of the invention is to devise a novel combined burner and grid, which can be covered by a top plate when used for broiling and toasting, and a removable polished tray is provided beneath the burner to support the article to be broiled or toasted. This polished plate also enables one to see from the top the condition of the flame of the burner when covered by a utensil.

With the above and other objects in view which will hereinafter more clearly appear in the detailed description and the appended claims, my invention comprehends a novel grid which has a burner incorporated in it.

Other novel features of construction and advantage will hereinafter appear in the detailed description and the appended claims.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a top plan view of a burner, embodying my invention, in assembled condition with the cooking top of a gas range.

Figure 2 is a section on line 2—2 of Figure 1.

Figure 3 is a section on line 3—3 of Figure 1, and showing also the cover and tray for use when broiling or toasting.

Figure 4 is a sectional view of another embodiment of the invention wherein an air space is provided between the burner and the cooking top.

Figure 5 is a top plan view of another embodiment of the invention, showing a different arrangement of burner bars.

Figures 6, 7 and 8 are sectional detailed views showing different arrangements of burner ports.

Figure 9 is a sectional elevation of my burner forming grid with a conventional reflecting bowl.

Similar numerals indicate corresponding parts.

Referring to the drawing:—

1 designates a burner embodying my invention in conjunction with a cooking top 2 of a conventional gas range.

The burner 1 is preferably in the form of an integral casting, having an outer annular portion 3, which is cored, as at 4, to form an annular fuel passage to which the fuel is introduced through the mixing tube 5, having, at its inlet end, a conventional mixing valve 6. The bars or fingers of the burner may have any desired arrangement, and, in Figures 1, 2, 3 and 4 are shown in the form of tubular fingers or bars 7 extending inwardly towards and terminating a desired distance from the center of the burner.

These fingers 7 communicate with the annular fuel space 4 and are provided with burner ports 8.

The upper faces of the fingers 6 are preferably substantially flush with the cooking top and have lugs or bosses 9 on which a cooking utensil 10 rests, so that the latter is spaced above the fingers to provide for proper venting of the products of combustion.

When the burner is to be used for broiling or toasting, an insulated cover 11 is placed over the burner in the manner shown in Figure 3, and a removable tray 12 is moved into position beneath the burner between guides 13 on the bottom 14 of the broiler compartment 15.

The depressed annular seat 16 in the cooking top for the burner may have an insulating ring 17, or the burner may have spacing lugs 18 which form an air insulating space 19 as seen in Figure 4.

The grid formation of the burner bars may have any desired configuration and arrangement. In Figure 5, the parallel burner bars 20 are in communication with a cross bar 21, said bars 20 and 21 communicating with the annular fuel passage of the burner and having burner ports along their sides.

The burner ports may have any desired arrangement which will provide for the proper heating of the utensil. In Figure 6, ports 22 are shown which incline downwardly. In Figure 7, the ports 23 are horizontal, while in Figure 8 the ports 24 incline upwardly.

I have, however, found in practice that good results are obtained if the burner ports open laterally through opposite sides of their respective bars or fingers, and, if desired, where fingers such as 7, shown in Figures 1 to 4 inclusive are employed, the free ends of the fingers may be provided with a desired number of ports as will be understood from Figure 4. These end ports are not essential in all cases, and can be omitted if desired. In Figure 9, I have shown the burner as seated in an enlarged reflecting bowl apertured at its bottom and seated flush with the top of the cooking surface of a range.

The tray 12 has its up surface polished to form a reflecting or mirror like surface.

It will now be apparent that I have devised a new and useful burner forming grid which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible to modification in various particulars without departing from the spirit or scope of the invention or sacrificing any of its advantages.

Having thus described my invention, what I claim as new and desire to secure by Letters Patent is:—

1. A burner in the form of an integral casting having at its outer portion an endless fuel passage with combined grid and burner members projecting inwardly from and communicating with said passage, and terminating in proximity to the central portion of the burner, said members forming the utensil supporting means and having burner ports at opposite sides.

2. A burner in the form of an integral casting having at its outer portion an endless fuel passage with combined grid and burner members projecting inwardly from and communicating with said passage, and terminating in proximity to the central portion of the burner, said members forming the utensil supporting means and having burner ports at opposite sides and having burner ports at their free ends.

3. The combination with a depressed annular seat in a range cooking top, of a burner having an outer fuel passage carried by and insulated from said seat and having tubular grid members communicating with and extending inwardly from said fuel passage and terminating in proximity to the central portion of the burner, said grid member having burner ports at opposite sides and provided with raised portions to support a cooking utensil above the top plane of the cooking top.

FRANK H. SCHNEIDER.